(No Model.) 2 Sheets—Sheet 1.
J. H. BURBANK.
BOOT TREE.
No. 293,945. Patented Feb. 19, 1884.
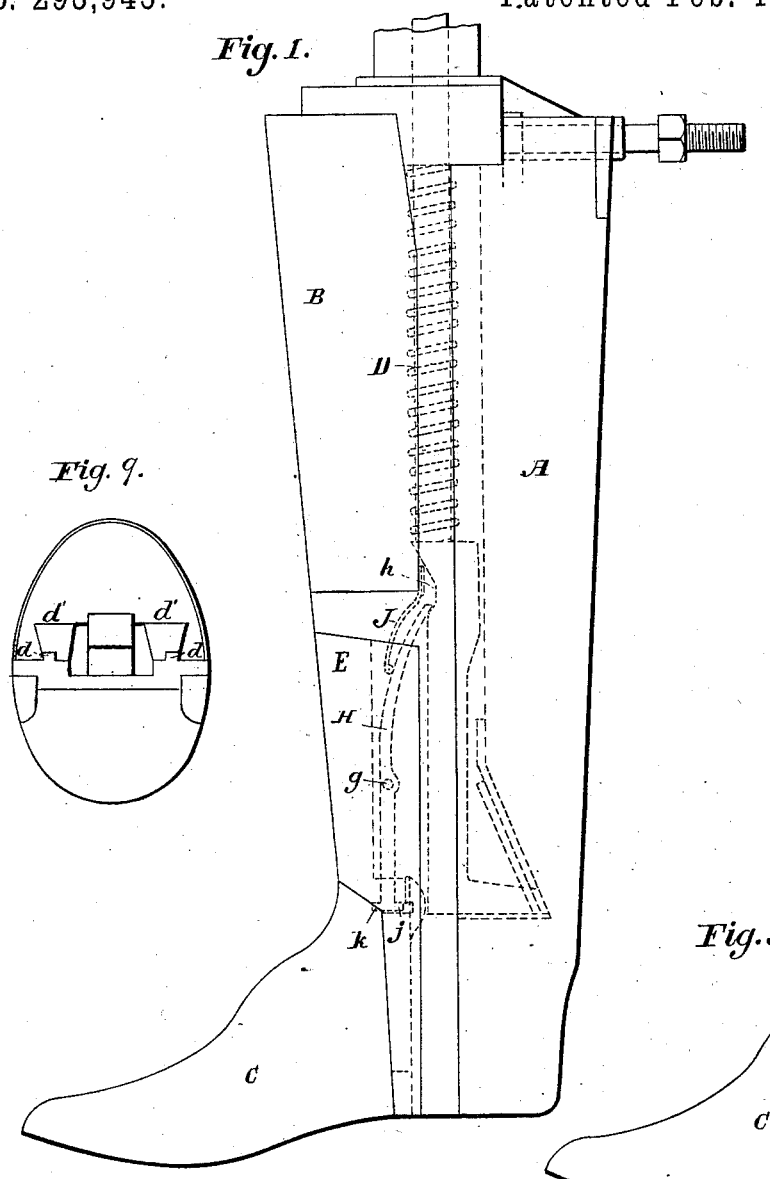
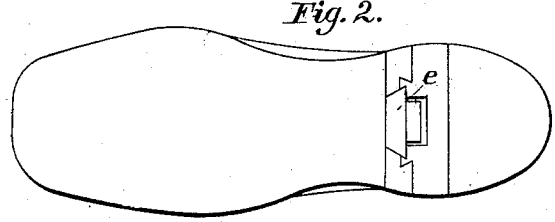
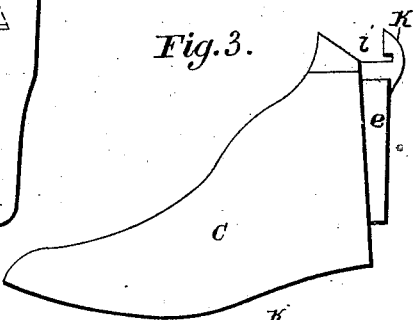
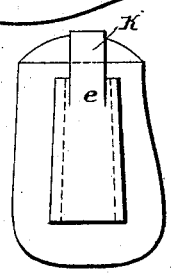
Attest:
J. Henry Kaiser.
Chas. C. Buckley
Inventor:
Jotham H. Burbank
by Knight Bros.
Attys.

(No Model.)
2 Sheets—Sheet 2.
J. H. BURBANK.
BOOT TREE.
No. 293,945. Patented Feb. 19, 1884.
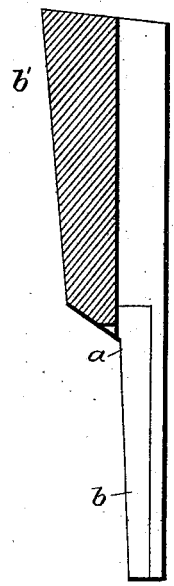
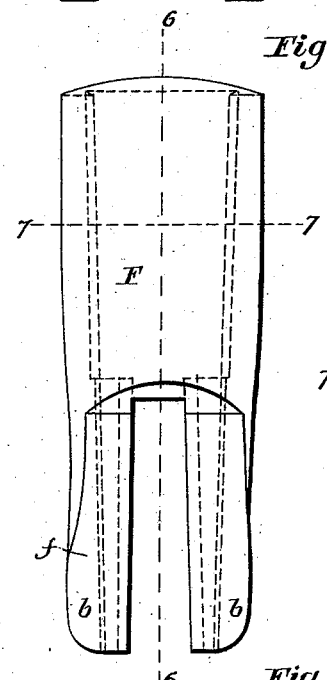
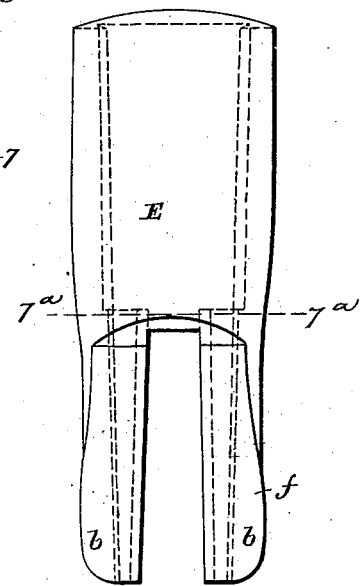
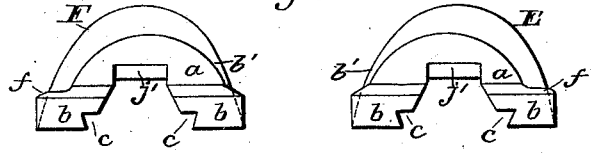
Attest:
J. Henry Kaiser.
Chas E Buckley.
Inventor:
Jotham H. Burbank
by Knight Bros.
Attys

UNITED STATES PATENT OFFICE.

JOTHAM H. BURBANK, OF NORTH BROOKFIELD, ASSIGNOR OF ONE-HALF TO ALFRED H. BATCHELLER, OF BOSTON, MASSACHUSETTS.

BOOT-TREE.

SPECIFICATION forming part of Letters Patent No. 293,945, dated February 19, 1884.

Application filed August 21, 1883. (No model.)

*To all whom it may concern:*

Be it known that I, JOTHAM H. BURBANK, of North Brookfield, Worcester county, Massachusetts, have invented a new and useful Improvement in Boot-Trees, of which the following is a specification.

My improvement consists in changeable front pieces or slips which are formed for right and left feet, respectively. The front piece, which corresponds with the right foot, has the center and line of fullness formed upon that side of the said front piece which, when secured to the tree and having placed thereon the right foot, presents upon the inside of the leg the proper shape for the application of the said tree to a right boot. The other front piece has the center and line of fullness upon that side which, when applied to the tree and in combination with the left foot, presents upon the inside of the leg the proper shape for application to a left boot. The feet are made rights and lefts through the ankle or where they connect with the tree.

My improvement further consists in the means by which I secure the front pieces and feet to the tree and securely lock the said parts to the tree, hereinafter fully described, reference being had to the accompanying drawings, in which—

Figure I is a side elevation of my improved boot-tree, showing the foot and front piece secured to the tree, and also the locking device in dotted lines. Fig. II is a plan view, showing the bottom of foot with the parts connected. Fig. III shows one of the feet with its heel-piece. Fig. IV shows the rear portion of heel-piece of foot. Fig. V is a detail view of the front pieces. Fig. VI is a sectional view of front piece on the line 6 6, Fig. V. Fig. VII is a sectional view of the front pieces on the lines 7 7 and 7ª 7ª, Fig. V. Fig. VIII is an end view of the front pieces. Fig. IX is an end view of tree, showing the projecting portions, the foot and slip being removed.

A represents the back piece of the boot-tree, B the front portion, and C the foot or last. The draw-bar or screw-rod is shown at D. I provide two front pieces or slips, E and F, (shown in Figs. V and VIII,) cut away at *a* to receive the foot, and formed with two legs, *b b*. Grooves *c c*, cut in the said legs of the front pieces, are slipped over the projecting portions *d d* on the tree when it is desired to secure either of the front pieces to the said tree. The said tongues *d d* are enlarged at their upper portions at *d' d'*, the front pieces being hollowed at their enlarged portions *b'* to receive them. The legs *b b* are so formed as to receive a heel-piece, *e*, on the foot, said heel-piece being slipped in between the two legs, and together forming a dovetail connection. The front piece (represented by E) has the swell *f* on that side of front-piece which, when attached to the tree and in combination with the right foot, brings said swell upon the inside of the leg; also, the enlarged portion *b'* of said front piece is made to slope more upon the inside than upon the outside. The front piece (represented by F) has the swell *f* upon the leg of the front piece and slope of enlarged portion *b'* on that side which, when placed upon the tree, in combination with the left foot, has said slope and swell on the inner side of the leg and in conformity with the said left foot. By this means I produce a right and left leg through the instep, which admits of the foot being made or shaped like the last upon which the boot is made.

Pivoted at *g* between the enlarged portions *d' d'* of the tongues *d d*, and moving within the hollowed portion of the front piece, is a lever, H, which is T-shaped at its lower and bent at its upper end, which latter impinges against the draw-bar D, which is so hollowed out at *h* as to present an inclined face. A spring-piece, J, secured to the tree and bearing upon the upper portion of the lever H, causes the end of the said lever to press against the face on the draw-bar D. The enlarged upper portion, K, of the heel-piece *e* has a recess, *i*, therein, which receives one of the lugs *j* of the lever H.

*j'* is a projection formed on the front piece, under which the opposite lug *k* of lever H engages.

When the draw-rod D is screwed upwardly to strain the boot, the front piece and foot having been placed in position, the upper end of the lever is moved out of the hollow face *h* and upon the plane of the draw-bar, thus causing the lug *j* on the lower end of lever to enter the recess *i* of the heel-piece, securely locking the same, and at the same time holding in position between the top of the foot and main body of tree the front piece.

When the strain is released, the upper end of lever is moved inwardly by pressure of spring-piece upon the face, releasing the lug *j*, and engaging the opposite lug, *k*, under the projection *j'* on front piece, thus preventing the same from becoming disengaged from the tree and drawing the same out of the boot.

Having thus described my invention, the following is what I claim as new therein and desire to secure by Letters Patent:

1. A boot-tree having right and left detachable and changeable foot and front pieces, each of the latter being formed, as described, with the fullness upon their respective sides, so that they may be used with one tree to properly form both right and left boots, substantially as and for the purpose set forth.

2. In a boot-tree, the right and left changeable front pieces, E and F, one of said front pieces having the center and line of fullness upon that side which, when attached to the tree, presents the proper form for a right-foot piece, while the other having the center and line of fullness upon that side which, when attached to the tree, presents the proper form for a left-foot piece, substantially as and for the purpose set forth.

3. In a boot-tree, the combination, with detachable foot and front pieces, of a double-acting locking-lever adapted to be operated by the draw-bar, and having a T-head adapted to lock the said foot and front pieces alternately when the draw-bar is moved out and in, respectively, as described.

4. In a boot-tree, the combination of draw-bar D with the T-shaped lever H, having the spring-piece J, bearing upon its upper end, and provided with the lug *j* at its lower end, engaging in the recess *i* of the heel-piece *e* when straining, and provided also with the lug *k*, engaging under the projection *j'* when the strain is released, substantially as and for the purpose set forth.

JOTHAM H. BURBANK.

Witnesses:
B. H. SMITH,
C. A. PEPPER.